Sept. 5, 1967 E. W. BULL 3,340,422

DYNAMIC CONVERGENCE CIRCUITS FOR MULTIPLE GUN CATHODE RAY TUBES

Filed Sept. 9, 1964 2 Sheets-Sheet 1

3,340,422
DYNAMIC CONVERGENCE CIRCUITS FOR MULTIPLE GUN CATHODE RAY TUBES

Eric William Bull, Sunbury-on-Thames, England, assignor to Electric & Musical Industries Limited, Hayes, England, a company of Great Britain Filed Sept. 9, 1964, Ser. No. 395,219
Claims priority, application Great Britain, Sept. 14, 1963, 36,271/63
4 Claims. (Cl. 315—22)

ABSTRACT OF THE DISCLOSURE

A dynamic convergence arrangement for a three-gun colour television receiving tube in which for line convergence a single control adjusts the proportion of sawtooth and parabolic currents supplied to each of the electromagnetic convergence coils via adding circuit or circuits. A similar arrangement is provided for field convergence.

This invention relates to colour television apparatus and especially to dynamic convergence circuits for use with a multiple cathode ray tube. Tubes of this nature are used for displaying images in colour television receivers.

A practical colour television receiver usually employs a three-gun shadow-mask colour reproducing tube as described for example in R.C.A. Review, volume XVI, March 1955, page 122 onwards. To ensure correct operation of such a tube the three beams should ideally converge together in the vicinity of the shadow-mask for all angles of deflection. A circuit arrangement commonly employed by which this result can be achieved with sufficient accuracy for practical purposes is one which applies convergence control to the three beams on the basis of six composite convergence correction waveforms. Thus composite control is employed at line frequency respectively to each of the three beams and separately different composite control at field frequency is also applied respectively to the beams. Each composite waveform is the sum of a sawtooth waveform proportional to deflection and a parabolic waveform proportional to the square of this deflection. For the purpose of correctly setting up the various waveforms applied to control the convergence of the beams 12 control knobs are normally provided, one for each component of each waveform. These knobs permit of the adjustment of any one component amplitude in any of the six composite convergence waveforms, three of which repeat at line repetition rate and three repeat at field repetition rate.

An object of the present invention is to provide a dynamic convergence system which can be adjusted with the aid of fewer convergence controls.

According to the present invention there is provided in a scanning circuit for a colour television receiver, including a three gun cathode ray tube for displaying coloured images and means for deflecting the beams from said guns in line and field directions to describe a television raster; an arrangement tending to produce dynamic convergence of the beams of said tube comprising (a) Electromagnetic means associated with each gun which when energised with convergence currents of line frequency set up magnetic fields causing convergence displacement of the beams from said guns, (b) Terminal means for supplying sawtooth currents of one of either field frequency or line frequency, (c) Terminal means for supplying parabolic currents of the same frequency as the sawtooth currents, (d) At least one combining means for combining said sawtooth and parabolic currents, (e) Means for applying said combined currents to each of said electromagnetic means, (f) Adjusting means associated with said electromagnetic means for adjusting the amplitudes of currents therein, (g) And a single means for adjusting the relative amplitudes of the sawtooth and parabolic currents applied to said adding means.

In order that the said invention may be clearly understood and readily carried into effect it will now be described with reference to the accompanying drawings, of which:

Figure 1:
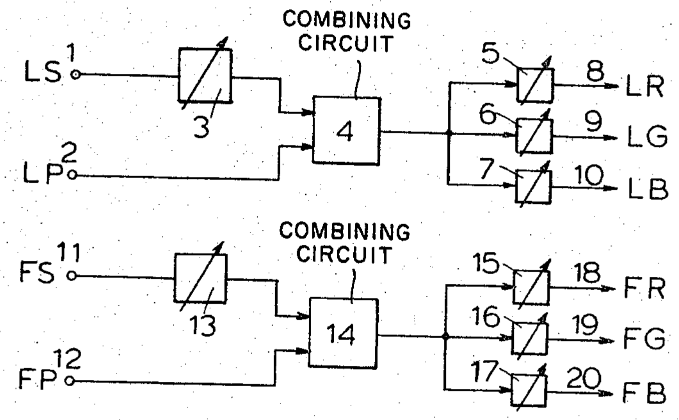
FIGURE 1 shows in diagrammatic form one example of the invention.

In FIGURE 1, the reference 1 indicates a terminal to which in operation there is applied a sawtooth voltage LS substantially proportional to deflection of the beams of the display tube at line repetition rate and 2 is a terminal to which there is applied a parabolic voltage LP proportional substantially to the square of the voltage applied to the terminal 1. The voltage at the terminal 1 is applied to the amplitude adjusting circuit 3 and thence to the combining circuit 4 to which is also applied the voltage on the terminal 2. The output from the combining circuit 4 is a composite waveform which is applied via the amplitude adjusting circuit 5 to the output conductor 8 to set up a voltage LR thereon which voltage is arranged to control the convergence of the red beam of a three-gun shadow-mask cathode ray tube, for example, of type 21AXP22 manufactured by the Radio Corporation of America. The output of the combining circuit 4 is also applied to a further amplitude adjusting circuit 6 on the output conductor 9 of which is set up a voltage LG for application to convergence controlling means operating on the green beam of the shadow-mask tube. The output from the combining circuit 4 is also applied to output conductor 10 after amplitude adjustment by the amplitude adjusting circuit 7 to set up in the conductor 10 a voltage LB which is used to control the convergence of the blue beam of the cathode ray tube.

A further pair of terminals 11 and 12 is provided and in operation there is applied to the terminal 11 a sawtooth voltage FS substantially proportional to deflection at field repetition rate. To the terminal 12 there is applied a parabolic voltage FP substantially proportional to the square of the voltage applied to the terminal 11. The amplitude control circuit 13 to which is applied the voltage appearing at the terminal 11 has an analogous function to that of the amplitude adjusting circuit 3. Reference 14 is a combining circuit for setting up a composite waveform analogous to the function of the combining circuit 4 is adjusted in amplitude by the amplitude adjusting circuits 15, 16 and 17 to produce voltages FR, FG and FB on conductors 18, 19 and 20 respectively, these voltages are then employed to control respectively the convergence of the red, green and blue beams of the display tube. The voltages LR, LG and LB may be added to the voltage FR, FG and FB, respectively, to provide three convergence waveforms, one for each gun of the tube, for application to respective convergence magnets. Alternatively the voltages LR, LG and LB, and FR, FG and FB may be applied to separate windings on the respective convergence magnets.

By adjustment of the amplitude control circuits 3, 5, 6 and 7 and 13, 15, 16 and 17 it is possible to bring about the dynamic convergence of the three beams of the display tube with sufficient accuracy for all angles of deflection of the beams.

Figure 2:
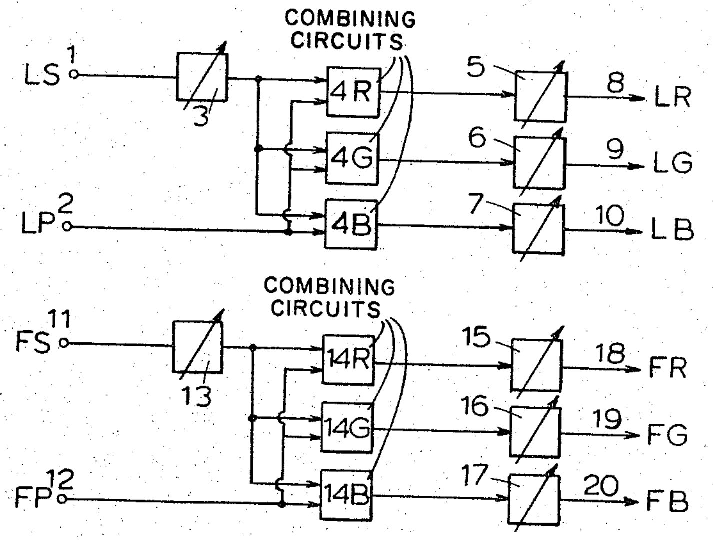
FIGURE 2 shows an alternative arrangement to that shown in FIGURE 1.

In the modification of the arrangement of FIGURE 1 shown in FIGURE 2 the combining circuits 4 and 14 of FIGURE 1 are replaced by separate combining circuits 4R, 4G and 4B and 14R, 14G and 14B for the different correction signals. This modified arrangement may lead to an increase in the accuracy of the dynamic convergence, because by suitable choice of the ratios of the combining circuits 4R, 4G and 4B, and 14R, 14G and 14B it is possible to provide correction waveforms having differing proportions of sawtooth and parabolic components as may be required under certain conditions, for example, when interaction between the scanning waveforms and the convergence correction waveform occurs.

According to a further aspect of the invention the circuits 6 and 16 are dispensed with and the outputs from the amplitude adjusting circuit 5 and 15 which are used respectively to exercise convergence control of the red beam at line and field repetition rate are also used similarly to control the convergence of the green beam. Such an arrangement is shown in greater detail in FIGURE 3.

Figure 3:
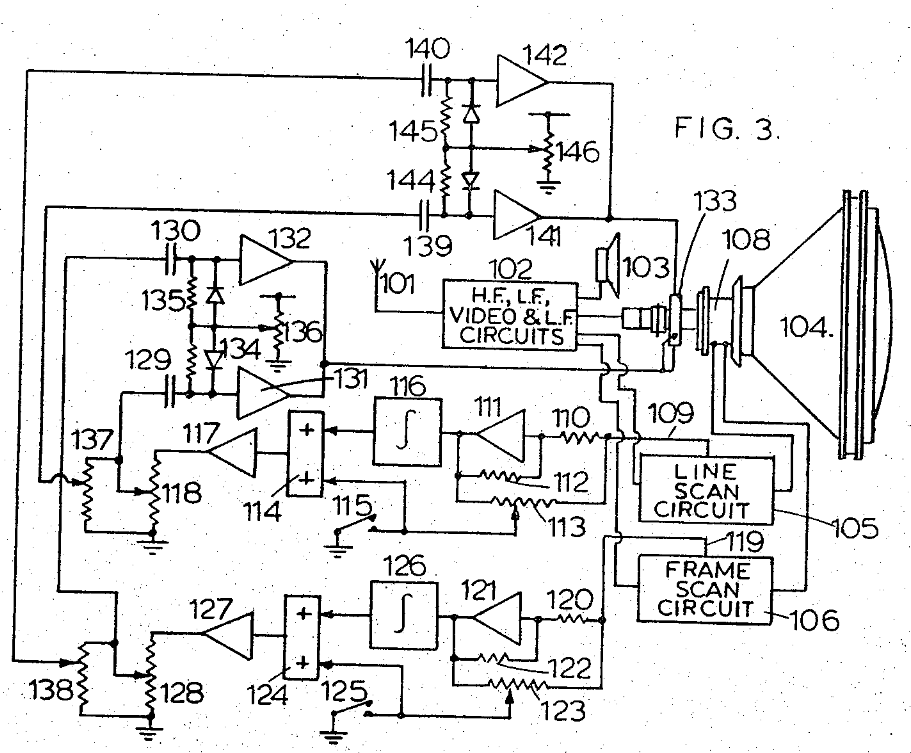
FIGURE 3 shows in block diagrammatic form one example of a colour television receiver having dynamic convergence according to the invention.

FIGURE 3 shows, in diagrammatic form, one example of a colour television receiver having a three-gun shadow-mask cathode ray tube to which dynamic convergence is applied. Signals received on the aerial 101 are amplified and detected in the usual manner by the H.F., I.F., video and L.F. circuits included in the block 102. The L.F. signals are applied to a loudspeaker 103. The video signals after suitable matrixing are applied to the shadow-mask cathode ray tube 104. The line and frame scan synchronising signals are applied respectively to the line and frame scanning circuits 105 and 106, which generate the line and frame scan waveforms which are applied to respective deflecting coils in the assembly 108 mounted on the tube 104. As so far described the arrangement is conventional and follows established colour television receiver practice.

A sawtooth voltage waveform at line repetition frequency, substantially proportional to horizontal deflection of the beams of the tube 104, is derived from the circuit 105 and appears on the conductor 109 by which it is applied via resistor 110 to the inverting amplifier 111. A feedback resistor 112 is connected across amplifier 111 and a potentiometer 113 is connected between the output of the amplifier 111 and the conductor 109. The wiper of the potentiometer 113 is connected to one input of a combining circuit 114 and via switch 115 to ground. The output of the amplifier 111 is integrated in block 116 and the integrated waveform, which is parabolic and substantially proportional to the square of the horizontal deflection of the beams of the tube 104, is applied to a second input of the combining circuit 114. The combined waveform from circuit 114 is amplified by amplifier 117 and applied across potentiometer 118. Components 119 to 128 are connected in similar fashion components 109 to 118 and response to a sawtooth voltage waveform at frame repetition frequency substantially proportional to vertical deflection of the beams of the tube 104, derived from the frame scan circuit 106.

The wipers of potentiometers 118 and 128 are connected via condensers 129 and 130 to the inputs of amplifiers 131 and 132 respectively. The amplifiers 131 and 132 have a common output circuit which is connected to both the red and the green convergence magnets included in the assembly 133 mounted on the tube 104. The inputs of amplifiers 131 and 132 include clamp circuits 134 and 135 connected to the wiper of potentiometer 136. Further potentiometers 137 and 138 are connected from the wipers of potentiometers 118 and 128 respectively to ground, and the wipers of potentiometers 137 and 138 are connected by means of clamping and amplifying arrangements similar to those just described to the blue electromagnets in the convergence magnet assembly 133. In other arrangements it may be found preferable to connect the potentiometers 137 and 138 across the potentiometers 118 and 128 respectively so that the correction signals for blue may be larger than those for the red and green guns.

In operation, the sawtooth waveform from the line scan circuit 105 is set up with opposite polarities at the ends of the potentiometer 113 by means of the inverting arrangement 110, 111 and 112 so that adjustment of the wiper of the potentiometer 113 can lead to the application of a sawtooth voltage waveform of a positive or negative polarity as required to the combining circuit 114. Of course, if a balanced sawtooth voltage waveform is available in the line scan circuit 105 then components 110, 111 and 112 may be omitted. The integrating circuit 116 converts the sawtooth waveform into a parabolic waveform which is combined with the sawtooth waveform in the circuit 114 so as to provide a composite waveform at line frequency across the potentiometer 118. Similarly a composite waveform at frame frequency is set up across potentiometer 128 and these two composite waveforms are applied via the amplifiers 131 and 132 respectively in parallel to effect dynamic convergence by means of the convergence magnet assembly 133. The clamp circuits 134 and 135 provide the datum level for the composite waveforms, the datum level itself being adjusted by the wiper of potentiometer 136 and the composite waveforms are combined in the output circuit of amplifiers 131 to produce the convergence waveform for the red and green guns of the tube 104. The operation of the circuits set up the convergence waveforms for the blue gun and is similar to that just described for the red and green guns.

To adjust the potentiometers, initially the potentiometers 118 and 128 (and the potentiometers 137 and 138 if they are connected across 118 and 128) have their wipers at the grounded end of the resistive tracks and the static convergence of the tube 104 is adjusted by means of adjustable permanent magnets in the assembly 133 and the potentiometers 136 and 146 to give convergence at the centre of the cathode ray tube 104. Then switches 115 and 125 are closed so as to remove the sawtooth components of the composite waveforms and the potentiometers 118 and 128 are adjusted to provide optimum convergence of red and green guns in response to the horizontal and vertical parabolic waveforms. Potentiometers 137 and 138 are then adjusted to provide optimum convergence of the blue gun in response to the horizontal and vertical parabolic waveforms. Switches 115 and 125 are then opened and potentiometers 113 and 123 are adjusted to provide the correct proportions of the sawtooth components.

Figure 4:
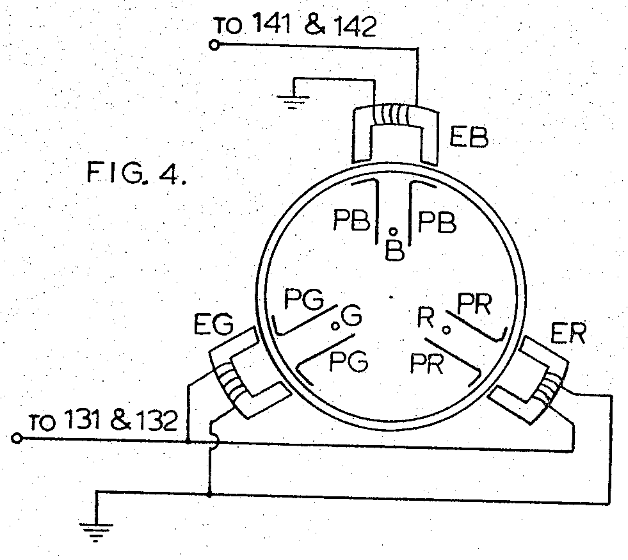
FIGURE 4 shows a detail of FIGURE 3.

FIGURE 4 shows in diagrammatic form the cross section of the tube 104 in the vicinity of the convergence magnet assembly 133. The red, green and blue electron guns produce electron beams having the references R, G and B respectively. Pole systems of magnetisable material PR, PG and PB are included within the envelope of the tube as shown to straddle the respective electron beams R, G and B. Electromagnets ER, EG and EB included in the assembly 133 are provided outside the tube envelope and the windings of these electromagnets are energised by the output currents of amplifiers 131 and 132, and 141 and 142 in the manner shown in the drawing. The electromagnets are placed outside the tube envelope so as to have good magnetic coupling with the respective pole systems PR, PG and PB within the envelope. Although not shown in the drawing associated with each electromagnet is an adjustable permanent magnet arrangement for initial adjustment of the static convergence of the beams, the final adjustment being achieved by potentiometers 136 and 146.

Although the invention has been described with respect to specific embodiments, it should be understood that it is in no wise limited to these embodiments and many other arrangements using the invention will be evident to those skilled in the art.

What we claim is:

1. In a scanning circuit for a colour television receiver, including a three gun cathode ray tube for displaying coloured images and means for deflecting the beams from said guns in line and field directions to describe a television raster; an arrangement tending to produce dynamic convergence of the beams of said tube, comprising (a) electromagnetic means associated with each gun which when energised with convergence currents of line or field frequency set up magnetic field causing convergence displacement of the beams from said guns, (b) terminal means for supplying sawtooth currents of one of either field frequency or line frequency, (c) terminal means for supplying parabolic currents of the same frequency as the sawtooth currents, (d) at least one combining means for combining said sawtooth and parabolic currents, (e) means for applying said combined currents to each of said electromagnetic means, (f) adjusting means associated with said electromagnetic means for adjusting the amplitudes of current therein, (g) and a single means for adjusting the relative amplitudes of the sawtooth and parabolic currents applied to said adding means.

2. In a scanning circuit for a colour television receiver, including a three-gun cathode ray tube for displaying coloured images and means for deflecting the beams from said gun in line and field directions to describe a television raster, an arrangement tending to produce dynamic convergence of the beams of said tube, comprising (a) electromagnetic means associated with each gun which when energised with convergence currents of line frequency set up magnetic fields causing convergence displacement of the beams from said guns, (b) terminal means for supplying sawtooth currents of line frequency, (c) terminal means for supplying parabolic currents of line frequency, (d) at least one combining means for combining said sawtooth and parabolic currents, (e) means for applying said combined currents to each of said electromagnetic means, (f) adjusting means associated with said electromagnetic means for adjusting the amplitudes of currents therein, (g) a single means for adjusting the relative amplitudes of the sawtooth and parabolic currents applied to said adding means, (h) and a further arrangement similar to that specified in paragraphs (a) and (g) inclusive but operative at field frequency.

3. An arrangement according to claim 1 in which the adjustment means associated with said electromagnetic means for adjusting the amplitudes of currents therein are capable of separate adjustment.

4. An arrangement according to claim 2 in which there is only one adding means for adding said sawtooth and parabolic currents of line frequency and there is only one adding means for adding said sawtooth and parabolic currents of field frequency.

References Cited

UNITED STATES PATENTS 3,114,858 12/1963 Schopp -------------- 315—22

JOHN W. CALDWELL, *Acting Primary Examiner.*

DAVID G. REDINBAUGH, *Examiner.*

T. A. GALLAGHER, J. A. O'BRIEN, *Assistant Examiners.*